US009648535B2

(12) United States Patent
Lei et al.

(10) Patent No.: US 9,648,535 B2
(45) Date of Patent: May 9, 2017

(54) METHOD AND APPARATUS FOR AUTONOMOUS OPERATION IN CELLULAR-BASED LOCAL AREA NETWORKS

(75) Inventors: Yixue Lei, Beijing (CN); Kodo Shu, Shanghai (CN); Haitao Li, Beijing (CN); Mika Petri Olavi Rinne, Espoo (FI)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 14/374,914

(22) PCT Filed: Feb. 7, 2012

(86) PCT No.: PCT/CN2012/070921
§ 371 (c)(1),
(2), (4) Date: Jul. 27, 2014

(87) PCT Pub. No.: WO2013/116984
PCT Pub. Date: Aug. 15, 2013

(65) Prior Publication Data
US 2014/0362691 A1    Dec. 11, 2014

(51) Int. Cl.
*H04W 36/22* (2009.01)
*H04W 48/18* (2009.01)
*H04W 48/06* (2009.01)

(52) U.S. Cl.
CPC .......... *H04W 36/22* (2013.01); *H04W 48/18* (2013.01); *H04W 48/06* (2013.01)

(58) Field of Classification Search
CPC .............................. H04W 48/18; H04W 36/22
See application file for complete search history.

(56) References Cited

U.S. PATENT DOCUMENTS

| 9,521,681 B2* | 12/2016 | Hulkkonen | H04W 16/14 |
| 2010/0054237 A1* | 3/2010 | Han | H04J 3/0638 370/350 |
| 2010/0279684 A1* | 11/2010 | Salkintzis | H04W 48/20 455/434 |

(Continued)

FOREIGN PATENT DOCUMENTS

| CN | 101925064 A | 12/2010 |
| CN | 102036216 A | 4/2011 |

(Continued)

OTHER PUBLICATIONS

International Search Report received for corresponding Patent Cooperation Treaty Application No. PCT/CN2012/070921 dated Nov. 15, 2012, 3 pages.

(Continued)

*Primary Examiner* — Khaled Kassim
*Assistant Examiner* — Syed S Ali
(74) *Attorney, Agent, or Firm* — Harrington & Smith (57) ABSTRACT

In accordance with an example embodiment of the present invention, a method comprises configuring an autonomous mode for traffic offloading; and indicating the autonomous mode towards at least one terminal, wherein said autonomous mode supports local area radio access connectivity by internet protocols to reduce control from a core network. Related apparatus and computer program product are also described.

11 Claims, 4 Drawing Sheets

(56) References Cited

U.S. PATENT DOCUMENTS

| | | | |
|---|---|---|---|
| 2011/0171953 A1* | 7/2011 | Faccin | H04W 48/08 455/426.1 |
| 2012/0278416 A1* | 11/2012 | Hurtta | H04W 8/082 709/206 |
| 2013/0064103 A1* | 3/2013 | Koskela | H04W 72/1284 370/252 |
| 2013/0089076 A1* | 4/2013 | Olvera-Hernandez | H04W 36/08 370/332 |
| 2013/0308527 A1* | 11/2013 | Chin | H04W 36/0022 370/328 |
| 2014/0148174 A1* | 5/2014 | Teyeb | H04W 36/0083 455/441 |
| 2014/0161026 A1* | 6/2014 | Stojanovski | H04L 45/22 370/328 |
| 2015/0092745 A1* | 4/2015 | Roeland | H04W 36/22 370/331 |
| 2015/0117406 A1* | 4/2015 | Kim | H04W 36/0022 370/331 |

FOREIGN PATENT DOCUMENTS

| | | |
|---|---|---|
| CN | 102209348 A | 5/2011 |
| CN | 102083170 A | 6/2011 |
| CN | 102369698 B | 3/2014 |
| WO | WO-2011/058213 A1 | 5/2011 |
| WO | WO-2011/130294 A2 | 10/2011 |
| WO | WO-2011/150546 A1 | 12/2011 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 10)", 3GPP TS 36.300, V10.5.0, Sep. 2011, pp. 1-194.

"3rd Generation Partnership Project; Technical Specification Group Radio Access Network; Mobility procedures for Home Node B (HNB); Overall description; Stage 2 (Release 10)", 3GPP TS 25.367, V10.0.0, Mar. 2011, pp. 1-14.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401, V10.5.0, Sep. 2011, pp. 1-282.

"3rd Generation Partnership Project; Technical Specification Group Services and System Aspects; LIPA Mobility and SIPTO at the Local Network; (Release 11)", 3GPP TR 23.859, V0.4.0, Jul. 2011, pp. 1-55.

Extended European Search Report received for corresponding European Patent Application No. 12867969.3, dated Sep. 29, 2015, 8 pages.

* cited by examiner

METHOD AND APPARATUS FOR AUTONOMOUS OPERATION IN CELLULAR-BASED LOCAL AREA NETWORKS

RELATED APPLICATION

This application was originally filed as PCT Application No. PCT/CN2012/070921 filed on Feb. 7, 2012.

TECHNICAL FIELD

The present application relates to traffic offloading in cellular technology based local area networks.

BACKGROUND

In cellular communications, for example wireless cellular communications, a user terminal may access various services through a signaling chain that traverses at least some of a base station, a base station controller, at least one core network node and at least one border gateway. In some networks, the network is configured to cause user traffic to bypass at least one of the nodes mentioned above. Such a bypass configuration may be termed offloading, whereby a user terminal may obtain services through a signaling chain that doesn't traverse a core network, for example.

Core network offloading has been discussed in the context of the third generation partnership project, 3GPP, because traffic loads are increasing concomitant with the growth of mobile device usage and proliferation of bandwidth consuming applications. Compared with conventional long term evolution/long term evolution-advanced, LTE/LTE-A, solutions such as femto cells or pico cells, long term evolution-local area network, LTE-LAN, is expected to be deployed eventually, for example, on licensed spectrum, on shared spectrum, for example, authorized shared access, ASA, on white spaces spectrum, or on unlicensed spectrum. LTE-LAN is a cellular technology based local area network, where cellular technology is one of LTE, LTE-A, high-speed packet access, HSPA, and the like. For any kind of spectrum used locally, LTE-LAN is expected to offload large volumes of traffic from macro cells and operator's core networks to a local area network.

SUMMARY

Various aspects of examples of the invention are set out in the claims.

According to a first aspect of the present invention, there is provided a method comprising: configuring an autonomous mode for traffic offloading; and indicating the autonomous mode towards at least one terminal, wherein said autonomous mode supports local area radio access connectivity by internet protocols to reduce control from a core network.

According to a second aspect of the present invention, there is provided an apparatus comprising: at least one processor; and at least one memory including computer program code; the at least one memory and the computer program code configured to, with the at least one processor, cause the apparatus to perform at least the following: configure an autonomous mode for traffic offloading; and indicate the autonomous mode towards at least one terminal, wherein said autonomous mode supports local area radio access connectivity by internet protocols to reduce control from a core network.

DESCRIPTION OF THE DRAWINGS

For a more complete understanding of example embodiments of the present invention, reference is now made to the following descriptions taken in connection with the accompanying drawings in which.

DETAILED DESCRIPTION

In LTE/LTE-Advanced femto cells, the home evolved node B, HeNB, is under the control of the core network. User equipment, UE, procedures for femto cells may involve the core network entities. The unlicensed spectrum is not owned by operators and the operators do not have full control over it. For LTE-LAN over unlicensed spectrum, core network control and involvement is reduced, when compared to using licensed spectrum, due to the nature of the unlicensed spectrum. For LTE-LAN over licensed spectrum, shared spectrum, or white spaces spectrum, less core network involvement is beneficial because it reduces control signaling and user traffic to an operator's core network.

Local IP Access, LIPA, is an example solution capable of supporting traffic offloading in a local internet protocol, IP, network. In this offloading approach, named here as conventional mode, the local bearer can not be established without core network involvement. The local bearers are also managed by core network entities when a UE is handed over from one home evolved node B, HeNB, to another HeNB. In conventional mode, core network, CN, involvements are needed for local bearer management and mobility handling in local area networks. This approach may face challenges with the increasing traffic load, which may be seen in upcoming years.

In a long term evolution-local area network, LTE-LAN, an enhanced traffic offloading approach, named here as autonomous mode, it is in some embodiments of the invention proposed to reduce core network involvement in procedures for local bearer management. In some embodiments of the invention, the core network needs not be involved in procedures for some local radio bearers, for example in the case of local radio bearer being a device-to-device radio bearer. Device-to-device bearer is setup for direct communication between at least two UEs. In autonomous mode, control signaling and data traffic can be localized without the load on core network.

Through an LTE-LAN access point, AP, with autonomous mode support, a UE can access a local network without involving core network entities such as, for example, a mobility management entity, MME, and/or a serving gateway, S-GW which are conventionally involved in a macro network control and traffic. AP maybe at least one of access point, base station, home node, evolved node, radio access node and the like that is an access point having cellular based radio access technology and connection to a fixed local area network, for example digital subscriber line technologies, xDSL, Ethernet, or intranet/Internet.

The autonomous mode further supports evolved packet system, EPS, bearer connectivity via the local network with less control from a core network. EPS bearer is a virtual connection between two end points, UE and packet dat network gateway, PDN-GW, to provide a bearer service. Less control of a core network means that the non-access stratum, NAS, procedures and handover path switching procedures between the radio access network and the core network are done in the macro cell radio access network without an interaction of autonomous local area network. In a femto cell solution, both the NAS procedures and path switching procedures involve the local femto cell. Traffic offloading according to the embodiments of this invention may improve the competitiveness of LTE technology in local area deployments.

In some cases, not all LTE-LAN APs can be configured to operate in autonomous mode. So, if a UE doesn't distinguish an LTE-LAN cell with autonomous mode capability from a normal cell, it may be unable to utilize the traffic offloading capability provided by the LTE-LAN AP. In LTE-LAN, UEs may have EPS bearer services and local area services in a local area network. The EPS bearer services may be controlled by the core network. The local area services may be controlled without input from the core network. An LTE-LAN AP supporting autonomous mode can support local area services for UE with less core network's control or according to other embodiments of the invention without core network control. If UE is not aware of the support for this kind of mode, it doesn't know whether it can establish radio access connectivity by internet protocols and whether it can request Internet services via the local network.

A LTE-LAN AP with autonomous mode configured may support offloading in a local area network. When a UE needs to access a local network, it may be configured to establish a radio resource control, RRC, connection with the LTE-LAN AP. The RRC connection may be authenticated by a local authentication server. With the autonomous mode, the UE can utilize the traffic offloading capability provided by the LTE-LAN AP. The UE can decide whether to establish an EPS bearer towards the core network or an IP connection towards the local network. The decision may be based at least in part on current or desired services of the UE. If the UE needs to access a local network via an LTE-LAN AP, it can execute radio access connectivity and establish IP connectivity to the local network after receiving autonomous mode information from the LTE-LAN AP.

On the other hand, a UE that does not wish to have local autonomous network connections may avoid the attempt for a radio access connectivity to an AP which signals autonomous mode. This saves UE and the local area network from serving unintentional access attempts that may be terminated in the early phase of the access. The autonomous mode indication therefore may save UE power and network resources by avoiding unnecessary access attempts.

The decision to access local network autonomously may be decided by the UE alone or alternatively may not be decided by the UE alone. The operator may set in the UE context inside the MME that autonomous network access is not allowed. Therefore autonomous network access may be enabled/disabled by the operator for a UE. From the autonomous mode indication of the AP, the UE may avoid unnecessary access attempts to those autonomous networks disabled for the UE.

In another embodiment of the invention, the UE may be configured by the operator defined management object, MO, whether it is allowed to access autonomous networks. The configuration may be set by the operator or proposed by the operator as an advisory guidance. Advisory guidance is the operator's recommendation about accessing the autonomous networks. Further, the configuration of the autonomous network access for a UE needs not be a "yes" or "no" for all autonomous networks. The operator may configure the autonomous networks with some of them allowed for access, some of them disabled for access, and some of them recommended for access, for example.

With autonomous mode information, the UE can distinguish LTE-LAN cells from normal cells which don't have traffic offloading capability in local area. A LTE-LAN capable UE may select LTE-LAN APs configured with autonomous mode at higher priority than normal cells without traffic offloading capability. LTE-LAN UEs without local access capability, UEs without the need to access local area, and UEs with local access disabled may ignore cells having autonomous mode indication, thereby avoiding cell reselection or handover procedure to a LTE-LAN AP configured with autonomous mode. With the autonomous mode indication which relates to a neighboring LTE-LAN cell, a UE may decide whether this neighboring LTE-LAN AP should be reported to a serving LTE-LAN AP in order to trigger RRC connection setup to this neighboring LTE-LAN AP. Therefore, the autonomous mode indication also serves the needs of cell selection, cell reselection, handover and connection re-establishment procedures.

Example embodiments of the present invention and their potential advantages are understood by referring to FIG. 1 through FIG. 5 of the drawings.

Figure 1:
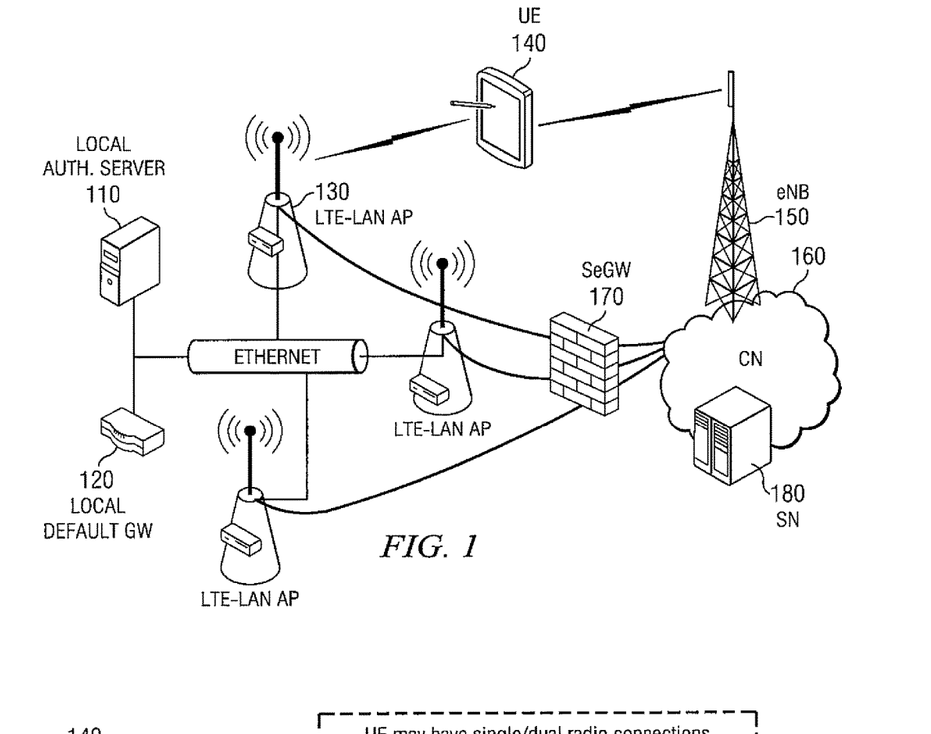
FIG. 1 depicts an example architecture of autonomous mode support in a cellular technology based local area system according to an example embodiment of the present invention.

FIG. 1 depicts an example architecture of autonomous mode support in a cellular technology based local area system according to an example embodiment of the present invention. The LTE-LAN AP 130 may be authenticated by local authentication server 110. UE 140 can access a local network via local gateway, L-GW, like IP router—Local Default GW 120. The LTE-LAN AP 130 may bridge LTE packet data convergence protocol, PDCP, packets into native IP packets which are routed within a local network. Support node, SN 180, is a logical node in configured to support local area optimization in LTE_LAN. Traffic offload may then be supported without any core network, CN 160, involvement, wherein the core network may comprise at least one security gateway, SeGW 170. The SeGW may for example include functions of network address translation, IP security tunneling, masking the subnet address, extending the subnet address, masking the address prefix. Gateway is a network node processing at least an IP address for at least a network interface to another network. eNB 150 is in the illustrated embodiment not comprised in the core network.

FIG. 1 depicts an example of the possible architectures. In the illustrated example, autonomous mode indication is performed between UE 140, LTE-LAN AP 130, and eNB 150. Such a mechanism can be independent of the architecture assumptions, especially the CN 160 architecture. UE 140, mobile phone, and the like are examples of terminal. eNB 150, radio network controller and the like are examples of base station. Autonomous mode can be supported whether the UE 140 has a single radio connection with LTE-LAN AP 130 or dual radio connections with both eNB 150 and LTE-LAN AP 130. In some embodiments, UE 140 is configured to maintain radio connections to LTE-LAN AP 130 and eNB 150 simultaneously. In case of dual radio connection, there may exist an association between the eNB 150 and LTE-LAN AP 130. In either single radio or dual radio cases, UE 140 may establish a bearer, for example an EPS bearer, towards the CN 160. The UE may access local networks through an LTE-LAN AP with autonomous mode support transparently to the CN 160.

Figure 2:
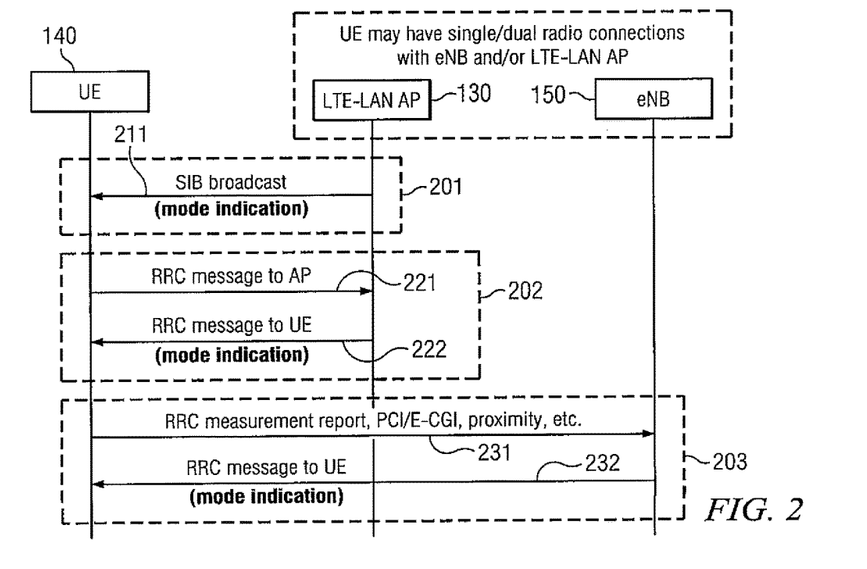
FIG. 2 depicts examples for an access point, AP, in a local area network or evolved node B, eNB, to indicate its autonomous mode to UE according to an example embodiment of the present invention.

FIG. 2 depicts examples for an AP in a local area network or eNB to indicate its autonomous mode to UE according to an example embodiment of the present invention. The example method according to FIG. 2 may be performed between UE 140, LTE-LAN AP 130 and eNB 150 according to FIG. 1.

In FIG. 2, an autonomous mode indication example is shown at block 201. When LTE-LAN AP 130 powers on and enters into autonomous mode, it may be configured to broadcast an autonomous mode indication to UE 140 by transmitting a system information block, SIB at block 201. This method may be used for idle mode UE which has no RRC connection with macro evolved Node B, eNB, and LTE-LAN AP for example. An idle mode UE may check the autonomous mode information and decide whether to access LTE-LAN cell based at least in part on the UE capabilities and the received information. The UE may select or reselect a LTE-LAN cell with autonomous mode at higher priority than other cells in order to reduce core network load if it needs to access local network, or can benefit from such access. Non LTE-LAN capable UEs or UEs having no demand for local area services can neglect the LTE-LAN cell. This may reduce the signaling load for local area cells.

FIG. 2, block 202 depicts another example of autonomous mode indication according to an example embodiment of the present invention. If the LTE-LAN AP 130 doesn't broadcast the autonomous mode in SIB, it may indicate capability for supporting the mode to the UE with downlink RRC messages. This dedicated signaling avoids the modification to SIB structure. The UE 140 may at block 221 be configured to send a RRC message towards the LTE-LAN AP 130 by using, for example, a RRC connection setup message. This RRC message could also be another newly defined RRC message. In block 222, the LTE-LAN AP 130 indicates the autonomous mode support to UE 140 in a RRC message to UE, this message could be the RRC connection setup complete message or another RRC message. Block 222 may occur responsive to block 221.

FIG. 2, block 203 depicts another example of autonomous mode indication according to an example embodiment of the present invention. In this example, eNB 150 indicates LTE-LAN AP 130's autonomous mode capability to UE 140 connected to eNB 150 when UE 140 approaches an LTE-LAN cell and reports its physical cell identifier, PCI, or evolved cell global identifier, E-CGI, or other identifier of the local cell to indicate its proximity, to eNB 150 at block 231, for example. According to an embodiment of the invention, eNB RRC messages need not be impacted by this invention. However, in another embodiment of the invention, new information elements in RRC message can be defined for mode indication. The newly defined, or enhanced, RRC messages or its information elements may be transmitted to UE 140 at block 232. Block 232 may occur responsive to block 231. This example avoids modifications in LTE-LAN AP 130. With this example, LTE-LAN AP 130 doesn't need to inform UE 140 of its autonomous mode capability. This is possible because in order to support dual radio connections, meaning one connection from LTE-LAN AP 130 and another from eNB 150, there should be an association between the LTE-LAN AP 130 and an eNB 150 The LTE-LAN AP 130 may be connected with the eNB 150 with an interface, for example an X2 interface or similar. An X2 interface specifies the inter-connection between eNBs. With such association, the UE's traffic via the eNB 150 can be offloaded to LTE-LAN AP 130.

To enable UE to maintain its EPS bearer connection and also support continuous traffic offloading to a local area network, autonomous mode indication may also be performed during handover. Optimally, a UE connected to an LTE-LAN AP with autonomous mode active shouldn't be handed over to a neighboring LTE-LAN AP without autonomous mode if it is necessary to guarantee continuous traffic offloading. If the local area services can not continue with the neighboring LTE-LAN cell, the UE may not be handed over to the neighboring cell. In order to guarantee the continuous offloading, mechanisms for LTE-LAN AP to notify UE about its autonomous mode may be needed. The mode indication may be inserted in handover related signaling messages. In some embodiments, where the UE roams toward an area that isn't served by any autonomous mode capable cells, the network is configured to cause handover to occur to a cell that doesn't support offloading, wherein the offloaded data streams may be diverted to traverse the core network in connection with the handover.

In some embodiments, to make a handover decision to a neighboring LTE-LAN cell, the serving LTE-LAN AP needs to know whether the neighboring cell is in autonomous mode or not. If the serving and neighboring LTE-LAN cells have the same autonomous mode capability, handover can be executed and local traffic offload is not interrupted in the local area network. Otherwise, UE may not be handed over to neighboring LTE-LAN cell if neighboring cell is not configured with autonomous mode without interrupting traffic offloading. The reason is that UE cannot access the local network after the handover to such neighboring cell and the continuity for the offloaded services may not be guaranteed. So, to ensure service continuity, UE may disconnect from LTE-LAN cell and redirect traffic to a macro cell if necessary.

Figure 3:
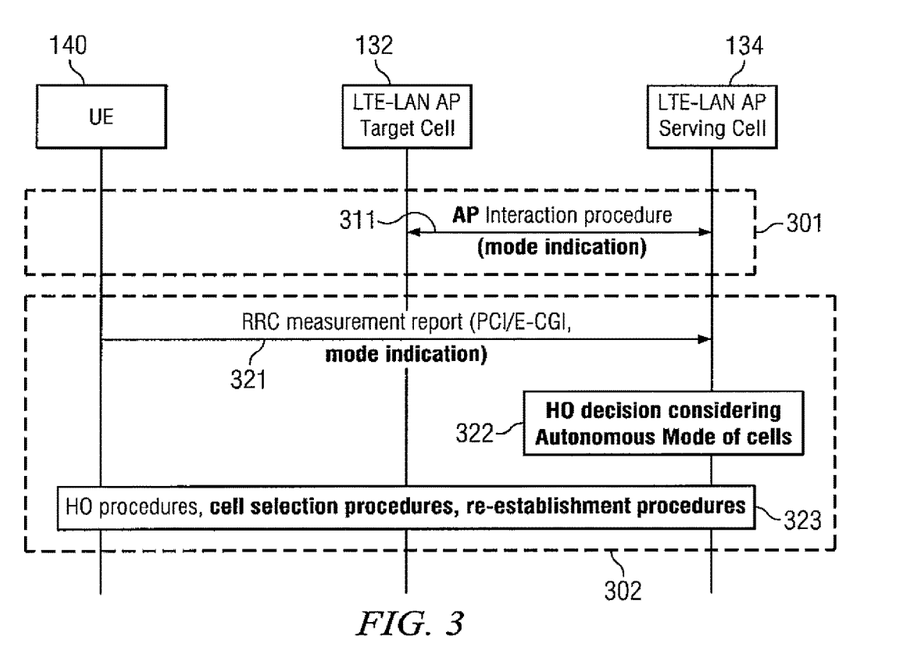
FIG. 3 depicts examples of handover related signaling for autonomous mode indication to enable continuous traffic offloading according to an example embodiment of the present invention.

FIG. 3 depicts examples of handover related signaling for autonomous mode indication to enable continuous traffic offloading according to an example embodiment of the present invention. The example signaling according to FIG. 3 may be performed between a UE 140 and LTE-LAN AP 130 according to FIG. 1. As shown in block 301, messages transmitted between LTE-LAN APs include autonomous mode information indication. One example message, eNB configuration update message, enhanced to include the autonomous mode indication is sent from LTE-LAN AP target cell 132 to LTE-LAN AP serving cell 134 at block 311 during an AP interaction procedure. Other newly defined messages comprising the indication may be used as alternatives to the illustrated message. With this signaling, the LTE-LAN AP 134 is made aware of the autonomous mode of the neighboring LTE-LAN AP cell 132.

In other example scenarios neighboring cell information maintenance is considered unnecessary in LTE-LAN AP as there may not be interfaces to connect one LTE-LAN AP with another. In this case, as shown in block 302, UE 140 indicates the autonomous mode capability of neighboring LTE-LAN cell 132 in a measurement report messages to the serving LTE-LAN AP 134 at block 321. The serving LTE-LAN AP 134 makes the handover decisions based on this autonomous mode indication contained inside the measurement report at block 322 and initiates the handover procedures at block 323. The illustrated blocks 301 and 302 may be alternatives to each other, but in some embodiments they may be both employed.

Similar to handover procedures, the UE may use the autonomous mode indication in its selection of the target cell in cell selection, cell reselection procedures and in connection re-establishment procedures in the local domain. Similar to handover procedures, the AP may use the autonomous mode indication in its selection of the target cell in cell selection, cell reselection procedures and in connection re-establishment procedures in the local domain.

According to another example embodiment of the present invention, the autonomous mode indication can be communicated to UE in a device management Management Object, MO, delivered by a network server. The Management Object can be included e.g. in the Access Network Discovery and Selection Function, ANDSF MO. The ANDSF MO is available for the UE as an extensible markup language, XML, script from a network server. The network server may be called an ANDSF server or it may be called a support node, SN, function of the local area, The UE may acquire information from a ANDSF MO by a get command, specifically requesting for that information. Alternatively, the network server may push a MO or the updates of a MO to the UE, as seen conveniently by the network server. The network server pushes local area network related MOs to the UE with autonomous mode information when the UE is in the proximity of a local area network. UE can optimize its search functions to save scanning energy and time based on the received MO.

Figure 4:
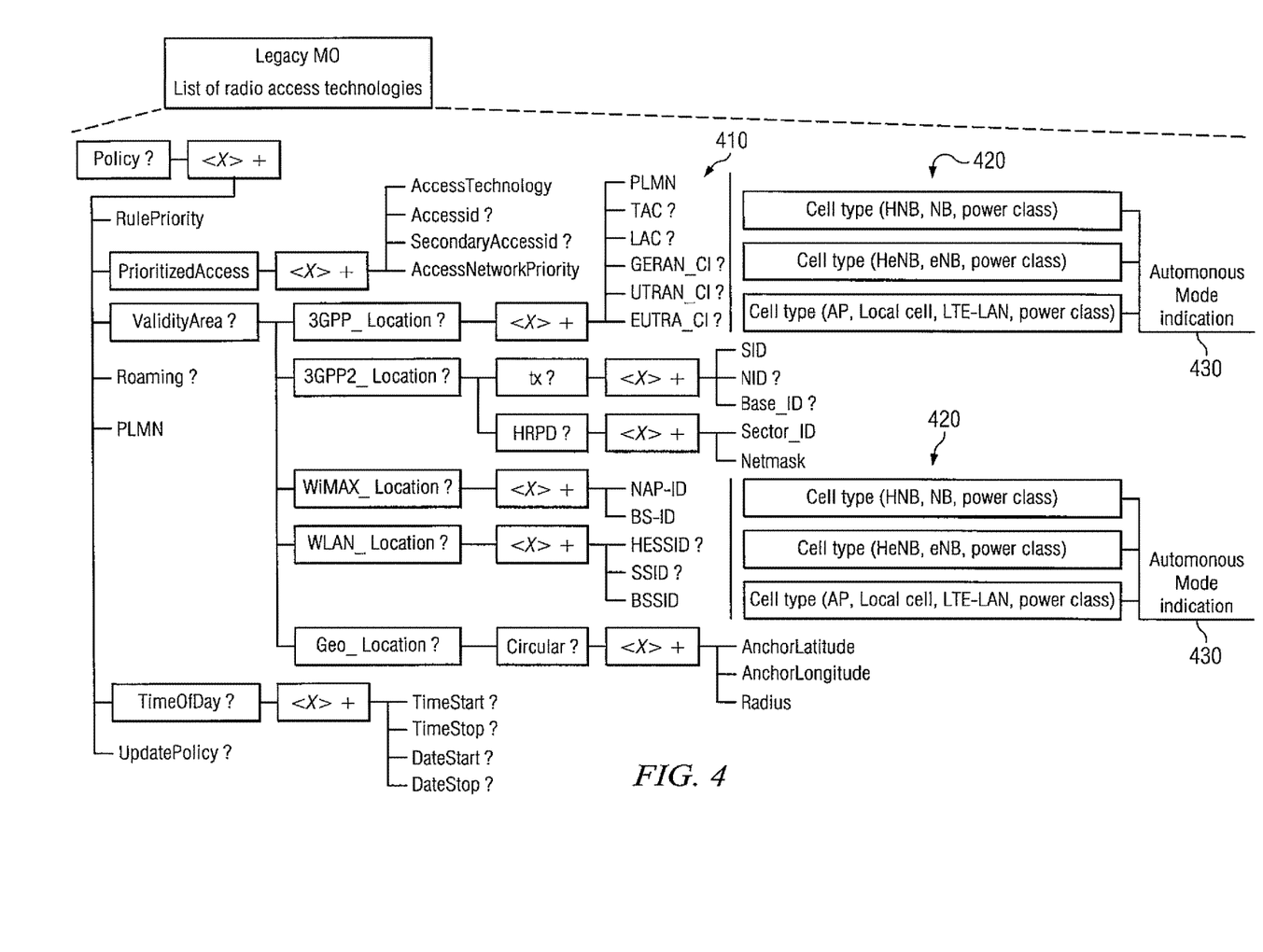
FIG. 4 depicts examples of autonomous mode indication by a device management object according to an example embodiment of the present invention.

FIG. 4 depicts examples of autonomous mode indication by a device management object according to an example embodiment of the present invention. The ANDSF MO 410 includes local access networks or eNBs and APs of various kinds 420. According to an example embodiment of the present invention, an autonomous mode indication 430 is added to the description of a LTE-LAN AP 420 included in the MO 410. This mode indication in the MO readily informs the UE about the autonomous local gateway connectivity that is reachable via the LTE-LAN AP. The LTE-LAN AP may have a default IP configuration available to connect the UE to the local network. According to another example embodiment of the present invention, the LTE-LAN AP may not have a default IP configuration, but it may route the dynamic host configuration protocol, DHCP, request from the UE to a DHCP server in that local domain. Therefore, the mode indication informs the UE that by connecting to the LTE-LAN AP, the UE has means to have local radio access connectivity, for example by internet protocol and autonomous mode. This local offloading connection may become available without direct involvement of the serving gateway or any other network element in the core network.

With the autonomous mode indication 430 for an LTE-LAN AP 420 in the MO 410, the UE is aware of the LTE-LAN AP's offloading capability without or with less involvement of the core network. This mode indication may impact the UEs choice, whether to report this cell to the network as a handover candidate cell or whether to attempt an access to the cell for an offload connection. Once the UE has a RRC connection to that autonomous LTE-LAN AP in the local network, it may receive an IP configuration given by the default IP configuration, or alternatively the UE may run a DHCP request. The UE is then able to manage this connection by the internet protocols.

Figure 5:
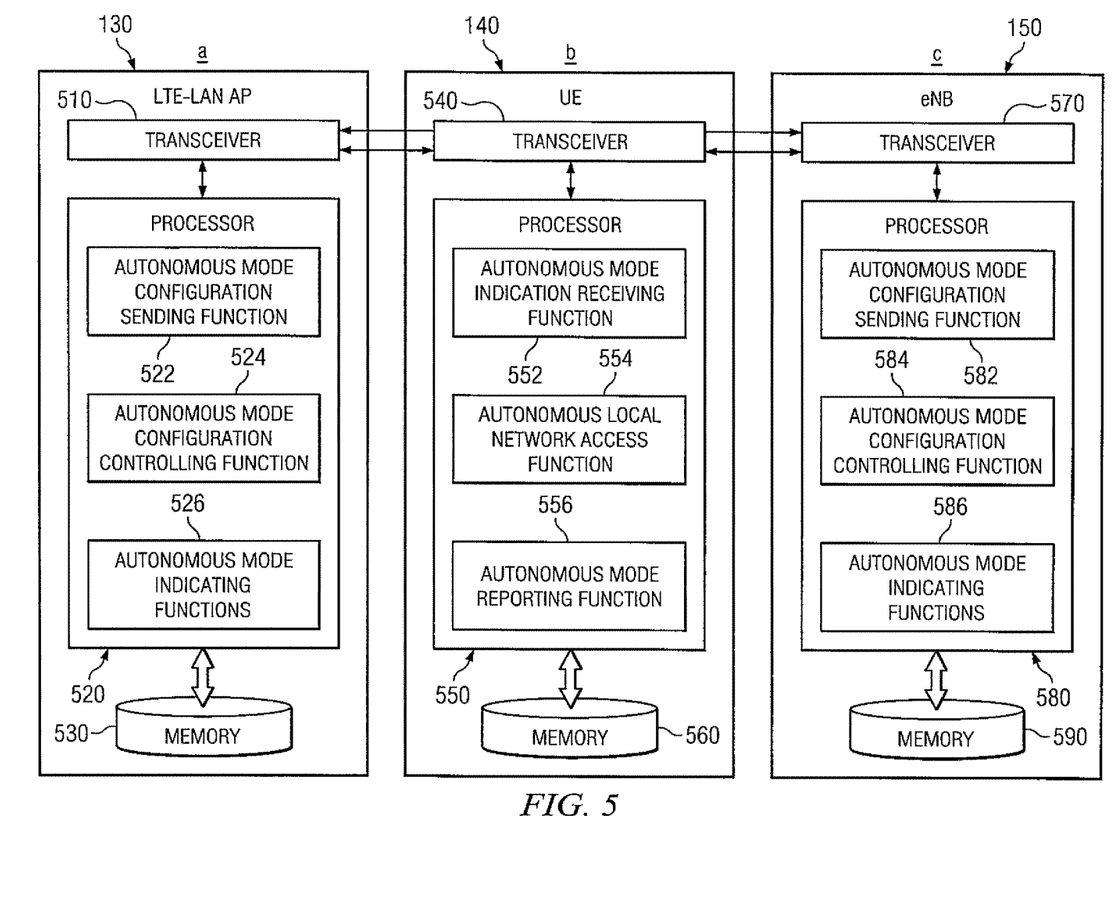
FIG. 5 depicts a schematic block diagram of example devices to operate a traffic offloading according to an example embodiment of the present invention.

FIG. 5 depicts a schematic block diagram of example devices to operate a traffic offloading according to an example embodiment of the present invention. As shown in FIG. 5(a), this apparatus LTE-LAN AP 130 according to an example embodiment of the present invention comprises a processor 520 and a transceiver 510 as well as, optionally, a memory 530. Specifically, the processor may be configured to receive an autonomous mode configuration by at least one measurement report from a UE on neighboring access point, thus representing means for receiving an autonomous mode configuration. Further, the processor may be configured to control the configuration of the autonomous mode support for traffic offloading, thus representing means for controlling the autonomous mode support for traffic offloading configuration. Further, the processor may be configured to indicate the autonomous mode towards at least one UE, thus representing means for indicating the autonomous mode to UEs. In other words, the processor may have a corresponding autonomous mode configuration receiving function 522, autonomous mode configuration function 524, and a corresponding autonomous mode configuration indication function 526.

As shown in FIG. 5(b), this apparatus UE 140 according to an example embodiments of the present invention comprises a processor 550 and a transceiver 540 as well as, optionally, a memory 560. Specifically, the processor may be configured to receive an autonomous mode indication from an LTE-LAN AP or eNB relating to autonomous mode support on the LTE-LAN AP, thus representing means for receiving an autonomous mode indication. The processor may be configured to connect the LTE-LAN AP to access local network according to the indication of autonomous mode support, thus representing means for performing local network access for traffic offloading. Further, the processor may be configured to report autonomous mode indication on the neighboring LTE-LAN APs in the measurement reports of said neighboring LTE-LAN APs to a serving LTE-LAN AP thus representing means for reporting autonomous mode of the neighboring access points. In other words, the processor may have a corresponding autonomous mode indication receiving function 552, a local network access function 554, and an autonomous mode reporting function 556.

As shown in FIG. 5(c), this apparatus eNB 150 according to an example embodiment of the present invention comprises a processor 580 and a transceiver 570 as well as, optionally, a memory 590. Specifically, the processor may be configured to receive an autonomous mode configuration by at least one measurement report from a UE on neighboring access point, thus representing means for receiving an autonomous mode configuration. Further, the processor may be configured to control the configuration of the autonomous mode support for LTE-LAN AP that it associates with, thus representing means for controlling the autonomous mode support for traffic offloading configuration. Further, the processor may be configured to indicate the autonomous mode towards at least one UE, thus representing means for indicating the autonomous mode to UEs. In other words, the processor may have a corresponding autonomous mode configuration receiving function 582, autonomous mode configuration function 584, and a corresponding autonomous mode configuration indication function 586.

Without in any way limiting the scope, interpretation, or application of the claims appearing below, a technical effect of one or more of the example embodiments disclosed herein is for eNB or LTE-LAN AP to provide its autonomous mode support indication to one or more UEs. Another technical effect of one or more of the example embodiments disclosed herein is handover related signaling messages with autonomous mode indication to support UE handling and enables continuous traffic offloading. Another technical effect of one or more of the example embodiments disclosed herein is the autonomous mode indication by one or more device management objects.

Embodiments of the present invention may be implemented in software, hardware, application logic or a combination of software, hardware and application logic. The software, application logic and/or hardware may reside on management system, base station or terminal. If desired, part of the software, application logic and/or hardware may reside on management system, part of the software, application logic and/or hardware may reside on base station, and part of the software, application logic and/or hardware may reside on terminal. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   receiving an autonomous mode indication of a serving cellular access point, wherein the receiving further comprises receiving the autonomous mode indication by at least one device management object from a network server, and wherein the network server is an Access Network Discovery and Selection Function (ANDSF) entity and the management object is received from at least one of a get command to the ANDSF and a push management object by the ANDSF;
   connecting with the cellular access point to access a local network by internet protocols to reduce control from a core network controlling the cellular access point, wherein the local network is accessed through the cellular access point in the autonomous mode so that local bearers are not provided by and are transparent to the core network, and wherein the connecting is for control signaling and data traffic for traffic offloading from the core network;
   receiving at least one autonomous mode indication from at least one neighboring access point; and
   indicating the at least one autonomous mode in a measurement report to the serving access point.

2. The method according to claim 1, wherein
   the receiving further comprises receiving the autonomous mode indication by at least one of a system information broadcasting and a radio resource control signaling from the access point.

3. The method according to claim 1, wherein
   the receiving further comprises receiving the autonomous mode indication by a radio resource control signaling from a base station associated with the access point.

4. An apparatus comprising: at least one processor; and at least one memory including computer program code; the at least one memory and the computer program code configured to, with the at least one processor, cause the apparatus to perform at least the following:
   configure an autonomous mode for traffic offloading of a serving cellular access point, wherein the receiving further comprises receiving the autonomous mode indication by at least one device management object from a network server, and wherein the network server is an Access Network Discovery and Selection Function (ANDSF) entity and the management object is received from at least one of a get command to the ANDSF and a push management object by the ANDSF;
   indicate the autonomous mode towards at least one terminal, wherein said autonomous mode supports local area radio access connectivity by internet protocols to reduce control from a core network controlling the cellular access point, wherein the local area radio access is accessed through the cellular access point in the autonomous mode so that local bearers are not provided by and are transparent to the core network, and wherein the connecting is for control signaling and data traffic for traffic offloading from the core network;
   receive at least one autonomous mode indication from at least one neighboring access point; and
   indicate the at least one autonomous mode in a measurement report to the serving access point.

5. The apparatus of claim 4, wherein the indication of the autonomous mode comprises at least one of:
   broadcasting an autonomous mode indicator by way of a system information message; and
   indicating the autonomous mode with a radio resource control signaling element.

6. The apparatus of claim 4, further caused to:
   indicate the autonomous mode of an access point with a configuration update signaling towards at least one neighboring access point.

7. The apparatus of claim 4, further caused to:
   receive an autonomous mode indicator from a neighboring access point; and
   hand over at least one terminal to the neighboring access point continuing the local area radio access connectivity by internet protocols.

8. An apparatus comprising: at least one processor; and at least one memory including computer program code; the at least one memory and the computer program code configured to, with the at least one processor, cause the apparatus to perform at least the following:
   receive an autonomous mode indication of a cellular access point, wherein the receiving further comprises receiving the autonomous mode indication by at least one device management object from a network server, and wherein the network server is an Access Network Discovery and Selection Function (ANDSF) entity and the management object is received from at least one of a get command to the ANDSF and a push management object by the ANDSF;

connect with the cellular access point to access local network by internet protocols to reduce control from a core network controlling the cellular access point, wherein the local network is accessed through the cellular access point in the autonomous mode so that local bearers are not provided by and are transparent to the core network, and wherein the connecting is for control signaling and data traffic for traffic offloading from the core network;

receive at least one autonomous mode indication from at least one neighboring access point; and indicate the at least one autonomous mode in a measurement report to the serving access point.

9. The apparatus of claim 8, wherein the receiving of the autonomous mode indication comprises receiving the autonomous mode indication by at least one of a system information broadcasting and a radio resource control signaling from the access point.

10. The apparatus of claim 9, wherein the autonomous mode indication is received by the system information broadcasting when the apparatus is in idle mode with no radio resource control connection with a base station associated with the access point.

11. The apparatus of claim 8, wherein the receiving of the autonomous mode indication comprises receiving the autonomous mode indication by a radio resource control signaling from the base station associated with the access point.

* * * * *